Nov. 23, 1926.  
F. FENTON  
1,607,885  
METHOD OF MAKING EXPANSIBLE ANNULAR BRAKE BANDS  
Filed Oct. 26, 1925
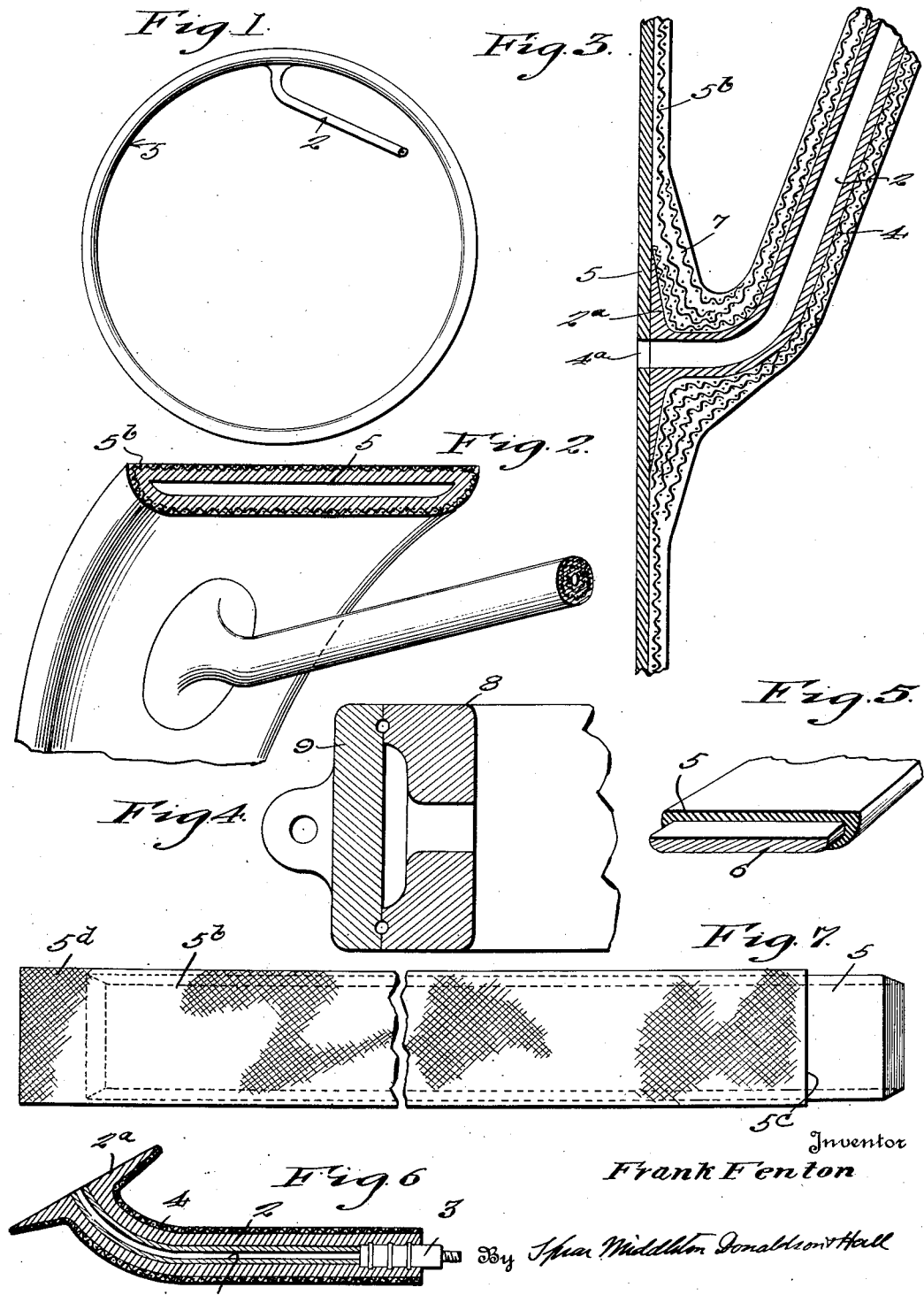
Inventor  
Frank Fenton Patented Nov. 23, 1926.

1,607,885

UNITED STATES PATENT OFFICE.

FRANK FENTON, OF AKRON, OHIO, ASSIGNOR TO THE MILLER RUBBER COMPANY, OF AKRON, OHIO, A CORPORATION OF OHIO.

METHOD OF MAKING EXPANSIBLE ANNULAR BRAKE BANDS.

Application filed October 26, 1925. Serial No. 65,009.

My present invention relates to the manufacture of annular expansible bands adapted for use in connection with the so-called hydraulic brakes of motor vehicles, and aims to provide a simple, economical and efficient method by which a strong and durable article may be produced.

The invention includes the novel method hereinafter described and defined by the appended claim.

In order that my invention may be better understood I have appended hereto explanatory drawings, in which:—

Figure 1 is a side elevation of a complete band.

Fig. 2 is an enlarged perspective view, partly broken away.

Fig. 3 is an enlarged section taken through the inflating tube and adjoining portion of the band, longitudinally of the latter before vulcanization, to show the manner of assembling the inflating tube and band body.

Fig. 4 is a sectional view of a mold suitable for curing the band.

Fig. 5 is a perspective view, partly broken away, showing a mandrel for forming the lining of the band, with a portion of the tube thereon.

Fig. 6 is a detail view illustrating the manner of making up the inflating tube.

Fig. 7 is a plan view of the band tube with its fabric covering, before being bent into annular form and the ends spliced.

In proceeding according to the invention, and referring first to convenience to the formation of the valve tube, I place on a suitable mandrel 1, preferably having an angular or deflected portion, a tube 2 of unvulcanized rubber provided at one end with a flange $2^a$, and at the other end with an inflating (check) valve of the ordinary tire type, as indicated at 3. Rubberized fabric is then wound around the inflating tube, and flange $2^a$, as indicated at 4 and the valve tube then vulcanized, preferably by enclosing it in a suitable mold (not shown).

A relatively flat hollow unvulcanized rubber tube 5 for forming the brake band is made, conveniently on a flat straight mandrel 6, Fig. 5, and is preferably semi-cured thereon. It is then cut to a length a little more than the circumference of the desired band, with skived or reversely beveled ends, and buffed all over and its exterior surface, including its ends, given a coating of rubber cement. A hole $4^a$ is then punched in the inner wall of the tube and the flange $2^a$ of the valve tube is applied to the surface of the tube 5 with the bore of the valve tube in alignment with the hole in the band tube. Said band tube is then covered with rubberized fabric, as indicated at $5^b$ and a reinforcing washer of similar fabric 7, is placed thereover around the stem. The band tube is then removed from the mandrel. The fabric covering of the band tube terminates short of one end of the band tube and projects beyond it at the other end, as indicated at $5^c$ and $5^d$ respectively, Fig. 7. The band tube is bent into annular form and the ends spliced by inserting the non-fabric covered end within the projecting fabric of the other end and pressing it against the cemented surface. Thereafter the annular band tube is placed in a mold such as shown in Fig. 4, comprising preferably an inner annular ring 8 having a hole therethrough to receive the valve tube, and an outer removable sectional ring member 9 capable of being secured in place in any desired manner. The band tube is then inflated by means of the valve tube and subjected to curing heat, the vulcanized article removed, and the valve removed from the valve tube, preferably by cutting off the tube adjacent the valve. The valve of course, may be removed from the cut off section and used over again.

By reason of the tube having been cut to a length slightly in excess of the circumference of the desired band, the closing of the mold causes the tube ends to be pressed firmly against each other, and an homogeneous air tight joint is secured.

In an article of the nature described, the air cavity must extend substantially across the article and must be of minimum volume, so that small deflection of a piston connected thereto will cause appreciable expansion of the tube. The corners inside must be sharp as shown. By semi-curing on the mandrel I am able to produce the article without danger of cracking the corners, and produce a uniform interior shape. Further danger of the inner walls adhering during application of the fabric covering is avoided.

Having thus described my invention, what I claim is:—

The method of making expansible hollow brake bands which consists in semi-curing a substantially flat rubber tube, punching a hole in the wall thereof, vulcanizing a rubber valve carrying tube, applying the valve carrying tube to the flat tube with its bore in alignment with the hole, covering the flat tube with rubberized fabric with the tube projecting beyond the fabric at one end and vice versa at the other, inserting the non-fabric covered end of the tube within the socket formed by the projecting fabric at the other end, placing the flat tube in a mold, inflating the flat tube within the mold by fluid introduced through the valve carrying tube, and then vulcanizing the whole.

In testimony whereof, I affix my signature.

FRANK FENTON.